Jan. 18, 1966   K. GIKA   3,230,024

SELF-LEVELING DEVICE

Filed Oct. 11, 1963

INVENTOR
KONSTANTIN GIKA
BY
ATTORNEY

United States Patent Office 3,230,024
Patented Jan. 18, 1966

3,230,024
SELF-LEVELING DEVICE
Konstantin Gika, New York, N.Y., assignor to American Machine & Foundry Company, a corporation of New Jersey
Filed Oct. 11, 1963, Ser. No. 315,588
Claims priority, application Switzerland, Mar. 6, 1963, 2,871/63
2 Claims. (Cl. 312—71)

This invention relates to self-levelling storing and dispensing apparatus such as that shown in U.S. Patent 2,977,172 granted March 28, 1961 to E. R. McCarten.

Apparata of this type find wide application in many fields, such as restaurants, cafeterias and industry, where they may be employed for articles such as dishes, work in progress, etc., which they store and automatically dispense at convenient height.

Briefly, such a device comprises a housing in which a vertically movable work carrier is supported by a helical spring. Whenever the user stacks items on the carrier, the latter descends against the spring an amount theoretically equal to the weight of the items placed thereon so that the topmost item is always at the same level.

In practice, however, certain problems arise because of the weight characteristics of different items, or varieties of similar items. Heretofore, in order to cause these devices to function correctly for a particular item, it was necessary to provide a spring having a constant that was a direct function of the item to be stored. Because of the great diversity in existing items, this has required that hundreds of different springs be kept in stock and that final assembly of a device could not be completed until after it was sold and not until the exact weight of the item to be stored was known. Furthermore, once such a device was assembled, it could not be varied to accommodate different items or to change its capacity unless it was dismantled and its spring replaced with another.

It is an object of the present invention to provide a simple mechanism for varying the load carrying characteristics of a self-levelling dispenser.

It is another object to provide a mechanism for varying the capacity of a self-levelling storing and dispensing device.

It is a particular object of the present invention to provide a mechanism for varying the characteristics of the helical spring employed in a self-levelling storing and dispensing device.

These and other objects, as well as numerous advantages, will appear from the following description in which reference is made to the accompanying drawings in which.

Figure 2:
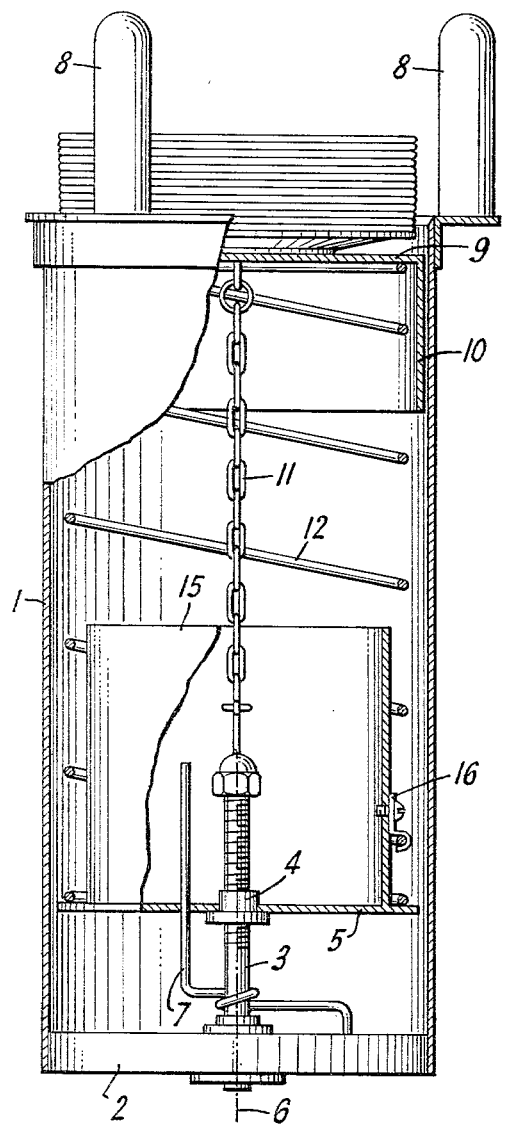
FIG. 2 is a similar view showing a modification of the present invention.

In the drawings, there is shown a self-levelling dispenser particularly adapted for plates or dishes, comprising a housing 1 generally of tubular form whose dimensions correspond to those of the items to be stored. The housing includes a bottom 2 at the center of which is rotatably mounted a threaded shaft 3 which extends axially into the interior of the housing 1. A supporting member 4 is screwed onto the central shaft 3 and carries with it a disc 5. The disc 5 is prevented from rotating around the central axis 6 of the housing 1 by a holding mechanism 7. By rotating the central shaft 3, the support member 4 and disc 5 may be caused to change their vertical position in the housing 1.

The upper extremity of the housing 1 is open and is furnished with bars 8 to guide the stack of items, in this example, dishes and plates emerging from the housing 1. A movable carrier 9 is located inside the housing 1 and is supported on a helical spring 12 which rests on the disc 5. Carrier 9 has a depending skirt 10, the purpose of which is to act as a guide for the carrier and to avoid jamming in the course of its vertical movement. The carrier 9 is connected to shaft 3 by means of a cable 11 or other flexible mechanism, so as to limit the carrier's upward travel. The length of cable is chosen so that the carrier 9 at its maximum upward distance is substantially level with the top of housing 1. In this position, it is preferable that the spring 12 be under a certain degree of pre-compression which might be obtained or regulated by varying the height of plate member 5.

In accordance with the present invention, there is provided a mechanism for adjusting and regulating the force of the spring so as to enable it to accommodate varying weights. This device is intended to operate in such a manner as to render inactive one or several turns or fractions of turns of the helical spring 12, thus causing the constant of the spring to be modified. With such a device, it is possible to use the same spring in a single apparatus designed for items of different weight.

Figure 1:
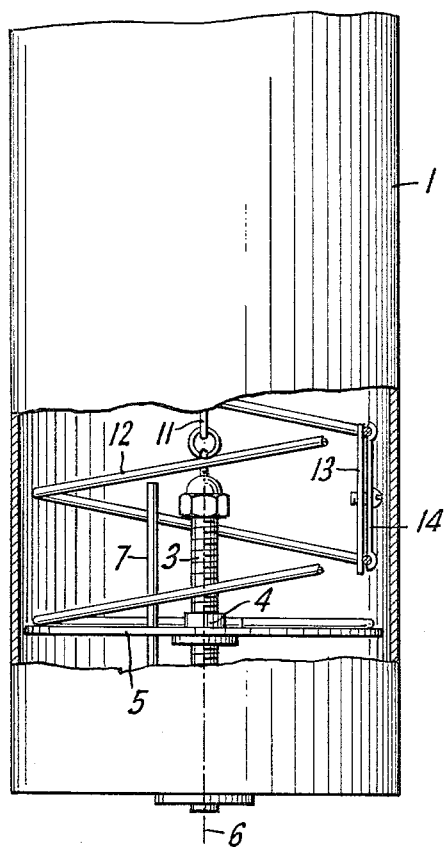
FIG. 1 is a vertical view partly in section of a dispenser embodying the present invention.

As illustrated in FIG. 1, the adjustment mechanism comprises a bracket 13, 14 which crosses and fixes the distance separating adjacent turns of the spring 12. This bracket is formed by two small plates, one of which, plate 14, has grooves intended to receive the wire forming the spring 12, which is clamped together by any suitable clamping device means.

It is possible, of course, to inactivate more than one complete turn of the spring 12 by employing two or more brackets 13, 14, or to render inactive any desired fractional length of the spring 12 by placing the bracket at an angle relative to the vertical axis of the spring. The constant of spring 12 can thus be readily adjusted to accommodate varying weights and items.

The described dispenser operates as follows:

When the device is empty, the carrier 9 occupies its uppermost position which is defined by the length of the chain 11. The user then places several items, plates and dishes in the illustrated example, on the carrier 9 between the guide bars 8. When the weight of the stack of dishes, in general four to six pieces, reaches and exceeds the pre-set value of the force exercised by the spring 12 on the carrier 9, the stack of dishes descends.

If the constant of the spring has been correctly set or chosen, then each time that the user places an additional dish or plate in the device, the support 9 will lower itself, through the effect of the weight of that item, by a distance corresponding to the thickness or the height of that item. In this manner, the dish or plate situated at the top of the stack resting on the support 9 is always situated at approximately the same level. In effect, the compression of a spring is substantially linear in relation to the load and the weight and geometrical shape of the dishes or plates may be considered as being approximately constant for the same type of dish or plate.

Should the movement of the carrier not be properly effected, adjustment of the spring constant is made by varying the position of or adding additional brackets 13, 14, until a satisfactory calibration is obtained.

In the modification shown in FIG. 2, the adjustment mechanism comprises a tubular element 15, coaxial with the housing 1, and whose diameter is slightly smaller than the diameter of the helical spring 12. This tubular element 15 is fastened at its lower extremity to the plate 5 and extends upwardly inside spring 12.

A clamp 16 is provided for fastening the spring 12 rigidly to the tubular element 15. By varying the height or position at which spring 12 is fastened to the tubular element 15, as measured from lower plate 5, the active length of the spring, namely, the number or fraction of active turns of said spring, may be changed, thus making it possible to chanrge as desired the spring constant. In this modification, the tubular element 15 also constitutes an effective guidance means for the spring 12, which is very important when long springs are being used.

In a variant, the tubular element could also enclose the helical spring and in another variant, the tubular element could be replaced by an elongated vertical strip arranged in parallel to the axis of the housing.

The method of operation of this second example of application of the storage device is identical with that of the modification shown in FIG. 1.

In another variant, not shown, the lower plate 5 may be provided with a depending skirt in the form of a threaded groove, whose thread corresponds to that of the helical spring 12 and with a diameter also corresponding to that of the spring. Thus, the spring could be more or less screwed onto this skirt, which would permit the modification of the constant of the spring. A bracket or fastener would then be used to fix the spring.

While this invention has been described and illustrated with reference to a dispenser for plates and dishes, it is obvious that it may also be utilized for the storage and dispensing of industrial items and products. Other modifications of the invention may also be made.

What is claimed is:

1. A self-levelling, storing and dispensing apparatus comprising, a housing, a helical compression spring, having a predetermined constant, supported in said housing and a carirer mounted on the uper end of said compression spring for supporting material stored in said housing, a tubular spring guidance member mounted coaxially within said helical spring, and clamping means for fastening at least a portion of said spring to said tubular member thereby inactivating said spring portion and varying the constant of said spring.

2. A self-levelling and storing dispenser comprising, a tubular housing, a vertically moveable support mounted at the bottom of said housing, means for elevating and lowering said support, a helical compression spring having a predetermined constant mounted vertically on said support, and a carrier for supporting material mounted on the upper portion of said spring, a tubular spring guidance member mounted within said housing on said support coaxially with said spring, and clamping means comprising a clamping strip secured to said guidance member and clampingly engaging said spring for fastening a portion of said spring to said tubular member thereby to inactivate said portion of said spring.

References Cited by the Examiner

UNITED STATES PATENTS

| | | | |
|---|---|---|---|
| 2,883,251 | 4/1959 | Du Bosque | 312—271 |
| 2,896,940 | 7/1959 | Lightbourn | 267—61 |
| 2,977,172 | 3/1961 | McCarten | 312—71 |
| 3,014,713 | 12/1961 | Fenton | 267—60 |
| 3,028,156 | 4/1962 | Roehrig | 267—28 |
| 3,157,392 | 11/1964 | Kitamura | 267—60 X |

CLAUDE A. LE ROY, *Primary Examiner.*